United States Patent [19]

Richey et al.

[11] Patent Number: 4,735,044

[45] Date of Patent: Apr. 5, 1988

[54] DUAL FUEL PATH STEM FOR A GAS TURBINE ENGINE

[75] Inventors: John M. Richey; Craig K. Ball, both of Cincinnati, Ohio

[73] Assignee: General Electric Company, Cincinnati, Ohio

[21] Appl. No.: 210,191

[22] Filed: Nov. 25, 1980

[51] Int. Cl.⁴ .............................................. F02C 7/22
[52] U.S. Cl. ..................................... 60/742; 239/424
[58] Field of Search ............... 60/742; 239/397.5, 424, 239/425, 132.1, 132.3

[56] References Cited

U.S. PATENT DOCUMENTS

| | | | |
|---|---|---|---|
| 3,028,102 | 4/1962 | Davies et al. | 239/424 |
| 3,055,179 | 9/1962 | Lefebvre et al. | 60/742 |
| 3,283,502 | 11/1966 | Lefebvre | 60/742 |
| 3,564,847 | 2/1971 | Wagner | 60/742 |
| 3,690,093 | 9/1972 | Carlisle | 60/39.74 R |
| 3,777,983 | 12/1973 | Hibbins | 60/742 |
| 3,788,067 | 1/1974 | Carlisle et al. | 60/39.74 B |
| 3,859,787 | 1/1975 | Anderson et al. | 60/39.71 |
| 3,869,865 | 3/1975 | Lacroix et al. | 60/39.66 |
| 4,070,826 | 1/1978 | Stenger et al. | 239/425 |
| 4,157,012 | 6/1979 | DuBell | 60/742 |
| 4,258,544 | 3/1981 | Gebhart et al. | 60/742 |

Primary Examiner—Louis J. Casaregola
Attorney, Agent, or Firm—Douglas S. Foote; Derek P. Lawrence

[57] ABSTRACT

A stem couples a fuel injector inlet to a fuel nozzle. The fuel nozzle includes a primary fuel flow portion and a secondary fuel flow portion. The stem includes an input end for receiving a primary fuel flow and a secondary fuel flow from the fuel injector inlet. The stem includes three concentric tubes with the first tube coupling the primary fuel flow from the injector to the primary portion of the nozzle. A second concentric tube couples the secondary fuel flow from the injector to the secondary portion of the nozzle. The primary fuel flow and the secondary fuel flow in the two concentric tubes are nonlinear with respect to the input and output ends of the stem. The third concentric tube provides structural support and an insulating space for the first two concentric tubes. Methods for constructing the stem are provided. Other embodiments are disclosed.

3 Claims, 2 Drawing Sheets

DUAL FUEL PATH STEM FOR A GAS TURBINE ENGINE

The invention herein described was made in the course of or under a contract, or a subcontract thereunder, with the U.S. Department of the Air Force.

BACKGROUND OF THE INVENTION

The present invention relates to a fuel nozzle stem for a gas turbine engine, and more particularly, to such a stem which includes dual nonlinear flowpaths for coupling a fuel injector inlet to a fuel nozzle.

In a conventional gas turbine engine, a combustor section is provided for igniting engine fuel with the resultant energy being used to drive other operating parts of the engine. The combustor includes at least one fuel nozzle located therein for supplying fuel to the combustor. The nozzle is coupled through a stem to a fuel injector inlet which is fixedly located at a position outside of the combustor. The fuel injector provides a controlled pressurized fuel flow through the stem to the nozzle.

Conventional stems are typically forged or cast and are satisfactory for many applications. However, it has been found that to provide desirable engine starting performance, it is often necessary to provide a dual path from the fuel injector inlet to the nozzle. For such applications, the nozzle is often referred to as a pressure atomized nozzle indicating that fuel pressure is utilized to provide an atomized fuel flow into the combustor for desirable combustor operation. Where such dual flowpaths are employed, and the flowpath between the fuel injector inlet and the fuel nozzle is not linear, such conventional stems are unsatisfactory. In this connection, from a manufacturing viewpoint, it is difficult and time-consuming to form such nonlinear flowpaths through forging and/or casting operations. In addition, such conventional linear stems are likely to exhibit poor insulating characteristics. Also, such linear stems are typically slanted aft toward the fuel nozzle, requiring a relatively long combustor section.

Accordingly, it is a general object of the present invention to provide improved stem means for a gas turbine engine.

It is another object of the present invention to provide such stem means which provides discrete nonlinear flowpaths.

It is another object of the present invention to provide such stem means having relatively good insulating characteristics.

It is another object of the present invention to provide such stem means which is relatively simple to form.

SUMMARY OF THE INVENTION

In one form of our invention, stem means is provided for a gas turbine engine. The gas turbine engine includes at least one fuel injector inlet for supplying a flow of pressurized fuel through the stem means to at least one fuel nozzle which develops an atomized fuel flow. The stem means is coupled between the fuel injector inlet and the fuel nozzle for directing the flow of pressurized fuel from the fuel injector inlet to the fuel nozzle. The stem means includes an input end coupled to the fuel injector inlet and an output end coupled to the fuel nozzle. The stem means includes at least two discrete flowpaths for directing the flow of pressurized fuel from the input end to the output end. Each of the two discrete flowpaths is nonlinear with respect to the positions of the input end and the output end. The input end and the output end are integrally connected.

BRIEF DESCRIPTION OF THE DRAWINGS

For a better understanding of the invention, reference may be had to the following description, taken in conjunction with the accompanying drawings, wherein.

DETAILED DESCRIPTION OF THE INVENTION

Figure 1:
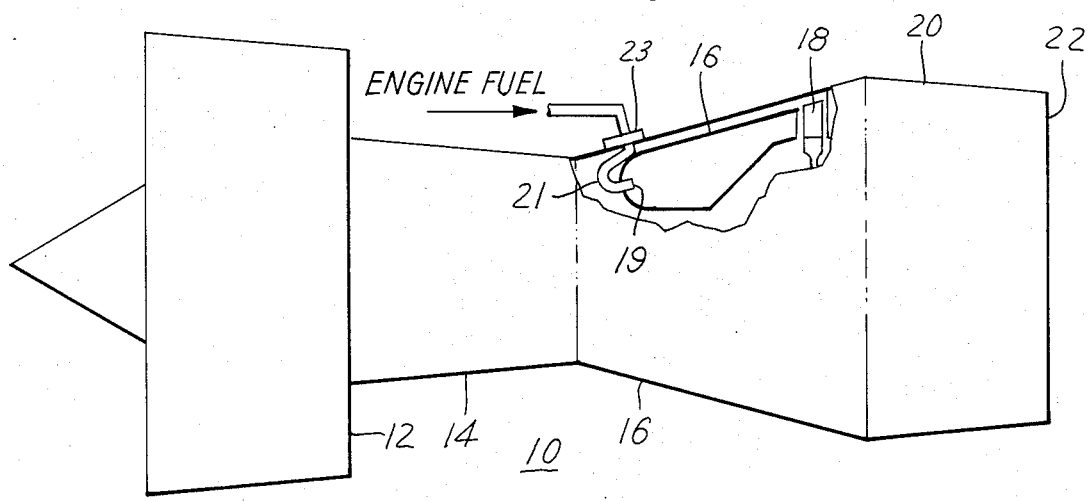
FIG. 1 is a partially broken away schematic representation of an exemplary gas turbine engine to which the present invention relates.

Referring initially to FIG. 1, one form of gas turbine engine to which the present invention relates is generally designated 10. The gas turbine engine 10 includes a fan section 12, a compressor section 14, a combustor section 16, a high pressure turbine section 18, a low pressure turbine section 20, and an exhaust section 22. The combustor section 16 includes a plurality of fuel nozzles 19 which receive the fuel flow to the engine and develop an atomized fuel flow for ignition in the combustor 16. The nozzle 19 is coupled through a stem 21 to a fuel injector inlet 23. The fuel injector inlet 23 is coupled to receive the engine fuel and controllably pass the engine fuel to the nozzle 19 for subsequent atomization and ignition.

Figure 2:
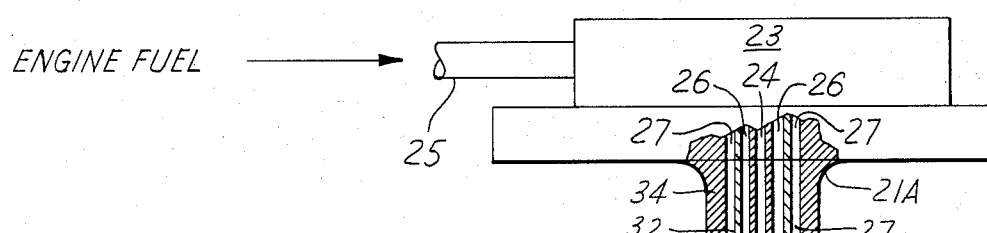
FIG. 2 is a partially broken away representation of one form of the stem means of the present invention.
Figure 2:
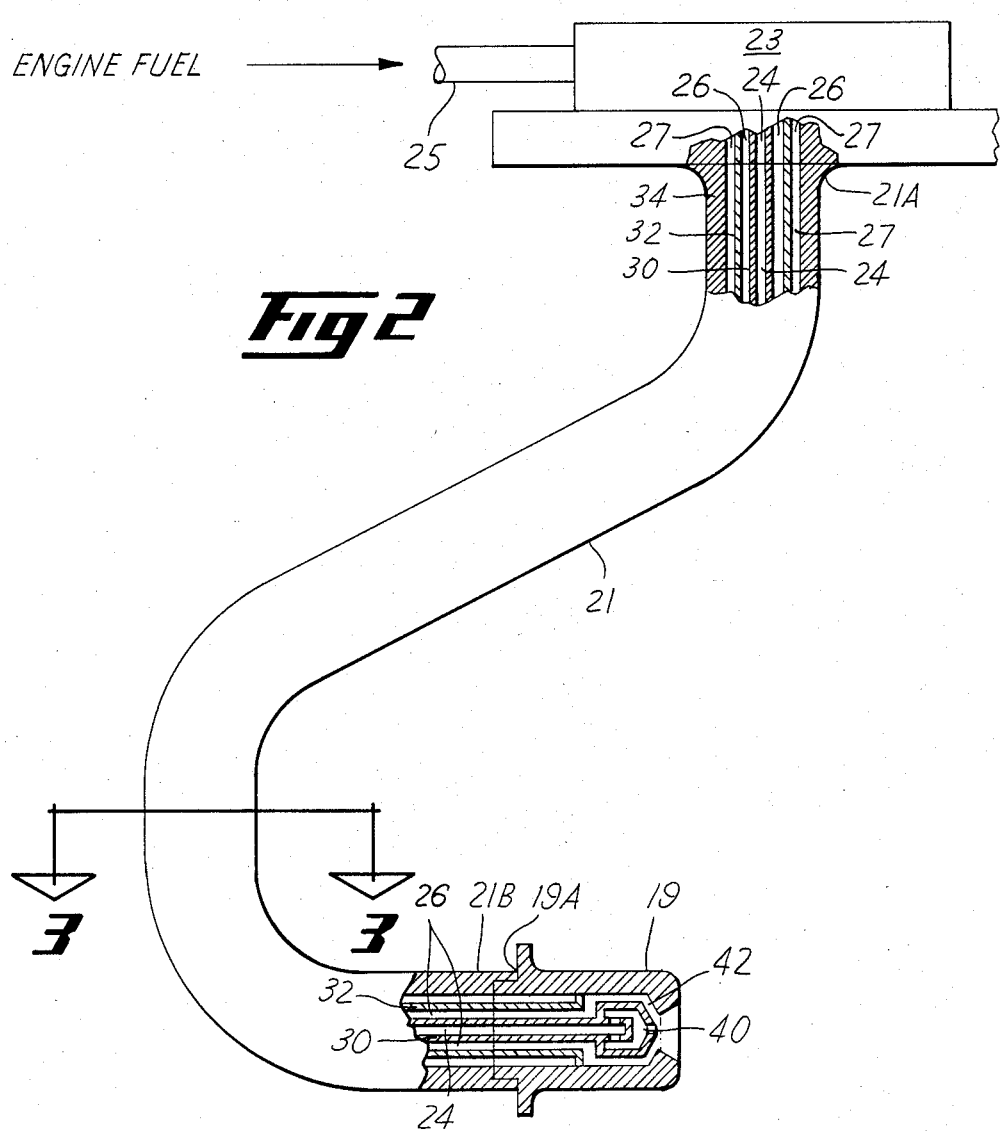

Referring now to FIG. 2, one form of the stem means 21 of the present invention is shown in further detail. As noted before, the fuel nozzle stem 21 is shown with an input end 21A coupled to the fuel injector inlet 23. An output end 21B of the stem 21 is coupled to the nozzle 19. The inlet 23 is coupled to receive fuel through conduit 25 from a fuel supply (not shown). The fuel injector inlet 23 receives the fuel through conduit 25 and develops a pressurized controlled fuel flow output. The output of the fuel injector inlet 23 is shown as including a primary flow output 24 and a concentric secondary fuel output 26. The stem 21 comprises concentric tubes 30, 32 and 34, as can be seen more clearly in FIG. 3. The input end 21A of the stem 21 is coupled to the output of the fuel injector inlet 23 such that tube 30 is aligned with primary output 24. Tube 34 is coupled to the inlet 23 such that output 26 is aligned with the space defined between tubes 30 and 32. Outer tube 34 is coupled to inlet 23 so as to completely insulate tubes 30 and 32. More particularly, tube 34 is preferably coupled to the inlet 23 wherein a portion of the pressurized fuel is free to enter therewithin in the space identified at 27.

The output end 21B of the stem 21 is coupled to the inlet end 19A of the nozzle 19. The nozzle 19 may, for example, comprise a pressure atomization-type nozzle which includes a primary nozzle portion 40 which is coupled to receive the primary flow through injector output 24 and tube 30. A secondary nozzle portion 42 is coupled to the output end 21B of the stem 21 to receive the secondary fuel flow through output 26 of the injector 23 and tubes 30 and 32 of the stem 21. Although the stem means of the present invention is suitable for use in combination with many conventional fuel nozzles, a preferred nozzle is described in copending patent application of R. E. Stenger, et al., entitled, "Fuel Nozzle for a Gas Turbine Engine," filed concurrently herewith. This copending patent application is assigned to the assignee of the present application and is hereby incorporated by reference in the present application.

Figure 3:
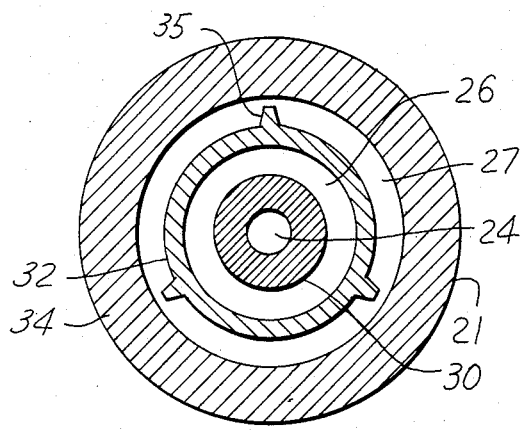
FIG. 3 is a sectional view taken along line 3—3 of FIG. 2.

In operation of the stem 21 of FIGS. 1-3, the fuel flow through outputs 24 and 26 of the injector 23 are separately controlled through control valves (not shown). For desirable starting operation of an exemplary gas turbine engine, the primary fuel flow through output 24 of injector 23, tube 30 of stem 21, and primary nozzle portion 40, is increased to a predetermined flow rate. When the predetermined primary fuel flow rate is established through the primary portion 40 of the nozzle 19, operation of the secondary nozzle portion 42 is initiated. Initiation of the secondary nozzle portion 42 is effected by opening the secondary output 26 of the injector 23 and passing the secondary flow through tubes 30 and 32.

In the form of the invention shown in FIGS. 2 and 3, the stem 21 includes concentric tubes 30 and 32, both of which are inside an outer tube 34. The outer tube 34 is preferably employed to provide structural support and thermal insulation. In this connection, it is desirable that the tube 34 be integrally formed with respect to the housing of the fuel injector inlet 23. It is desirable to shield the outer secondary tube 32 from the exterior tube 34, as the outer tube 34 is typically exposed to hot compressor discharge air. One means to provide such shielding is through the use of spacer wires 35 periodically attached to the secondary tube 32. With the exemplary stem 21 of FIGS. 2 and 3, the inner primary tube 30 is completely insulated by being completely inside the secondary tube 32. Further, the secondary tube 32 is not connected either to the inner tube 30 or to the outer tube 34. In this connection, the secondary tube 32 is actually permitted to float. The space 27 defined between the secondary tube 32 and the outer structural tube 34 typically receives a portion of the fuel flow which then functions to provide further insulation to the primary and secondary tubes 30 and 32, respectively. Thus, low thermal stresses are present in all three of the tubes because of the concentric structure as well as the internal insulation gaps that are provided.

In the construction of the stem 21, shown in FIGS. 2 and 3, three tubular members may be provided, e.g., formed, machined, to constitute tubes 30, 32, and 34. Typically, tubes 30 and 32 are of materials such as stainless steel, commercially available under the designation AISI 321SS. Tube 34 provides structual support and may, for example, comprise a high temperature nickel base alloy such as the one commercially available under the designation AMS-5754.

The three tubes may be disposed concentrically as shown in FIG. 3 and then bent to the configuration shown in FIG. 2 in which the flowpaths between the input end 21A and the output end 21B are nonlinear. This results in a stem 21 having input and output ends 21A, 21B, respectively, which are integrally connected. If desired, the three concentric tube structure of FIGS. 2 and 3 may be provided by suitably machining a single workpiece for each desired tube. In this connection, conventional, straight-through processing can be employed to provide the concentric tube structure shown in FIG. 3. It is to be noted that such conventional processing can be done when the input end 21A and the output end 21B of the stem 21 are linear. In this approach, after the concentric tube structure has been obtained, the machined stem 21 can then be bent to the particular shape needed, such as the stem 21 shown in FIG. 2.

Figure 4:
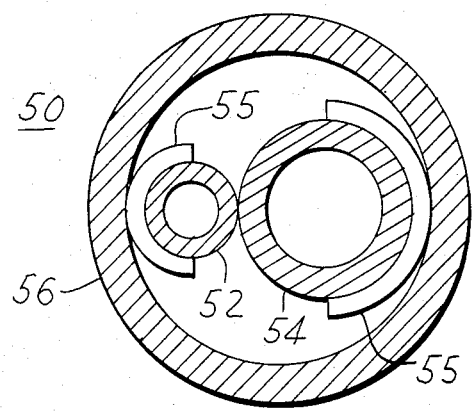
FIGS. 4 and 5 are sectional views, taken as in FIG. 3, respectively showing other forms of the stem means of the present invention.

Referring now to FIG. 4, a portion of another form of the stem of the present invention is generally designated 50. In the stem 50, primary tube 52 and secondary tube 54 are disposed within outer structural tube 56. Spacers 55 are provided to protect the inner tubes 52 and 54 from contact with the hot outer tube 56. The stem 50 is again suitable for those applications in which the input and output ends (not shown) of the stem are not linear. Of course, to accommodate the stem cross section shown in FIG. 4, it is necessary that the fuel injector inlet (not shown) and the fuel nozzle (not shown) must be provided with output and input portions, respectively, for mating with the stem 50.

Figure 5:
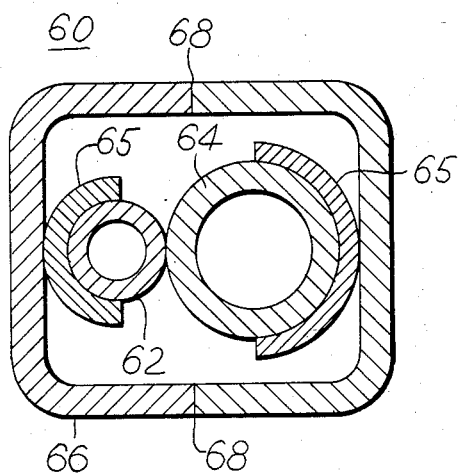

Referring now to FIG. 5, a portion of another form of stem of the present invention is generally designated 60. In the stem 60, primary tube 62 and secondary tube 64 are provided within outer structural tube 66 which is noncircular in cross section. Structural tube 66 may be fabricated through a weld 68 for joining forged portions thereof. Spacers 65 are preferably provided for insulation purposes. The stem 60 of FIG. 5 is desirable for those applications in which the stem is to be manufactured through the processing of single workpieces. As noted above in connection with the stem 50 of FIG. 4, the fuel injector inlet (not shown) and the fuel nozzle (not shown) must be provided with mating portions.

Figure 6:
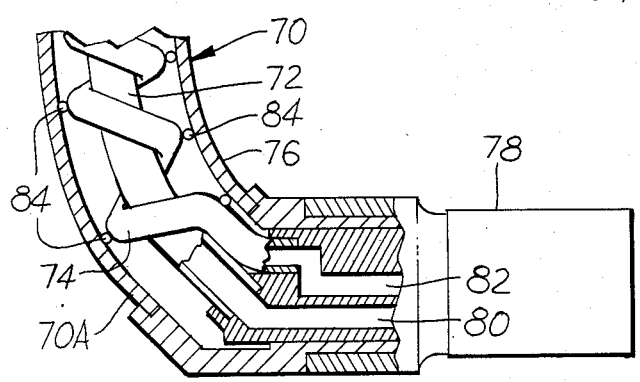
FIG. 6 is a partially broken away view, taken as in FIG. 2, showing a portion of another form of the stem means of the present invention.

Referring now to FIG. 6, a portion of another form of the stem of the present invention is generally designated 70. The stem 70 includes a primary tube 72 and a secondary tube 74 helically disposed therearound. The primary tube 72 and the secondary tube 74 are disposed within an outer structural tube 76. The output end 70A of the stem 70 is coupled to a nozzle 78 which is adapted to have its primary input 80 and secondary input 82 respectively coupled to the primary tube 72 and secondary tube 74 of the stem 70. Spacers 84 in the form of wires are preferably provided along the exterior of secondary tube 74.

Thus, there is provided by the present invention a stem which provides discrete, nonlinear primary and secondary flowpaths between a fuel injector inlet and a nozzle. In addition, the stem of the present invention exhibits relatively good insulating characteristics. Further, the stem of the present invention is relatively simple to form. Also, the nonlinear flowpaths of the stem of the present invention permit the stem to be slanted forward in contrast to conventional stems which are typically slanted aft or radially with respect to the fuel nozzle. Thus, the stem of the present invention permits a shorter overall length of the combustor section.

In addition, the stem of the present invention is suitable for applications other than the previously-discussed exemplary gas turbine engine. Indeed, the stem of the present invention is applicable to any gas turbine engine such as one which includes only a compressor section, a combustor section and an exhaust section. Further, the stem may also be employed to supply a fuel nozzle, e.g., orifice, in an augmentation section in a gas turbine engine.

While the present invention has been described with reference to specific embodiments thereof, it will be obvious to those skilled in the art that various changes and modifications may be made without departing from the invention in its broader aspects. It is contemplated in the appended claims to cover all variations and modifications of the invention which come within the true spirit and scope of our invention.

What is claimed as new and desired to be secured by Letters Patent of the United States is:

1. A method of forming a nonlinear dual fuel path stem for a gas turbine engine, comprising the steps of:
   (a) providing a substantially linear generally tube shaped integral first member for carrying a first fuel flow, said first member having an input end and an output end;
   (b) providing a substantially linear generally tube shaped integral second member for carrying a second fuel flow, said second member having an input end and an output end;
   (c) providing a substantially linear structural integral third member, said third member having an input end and an output end;
   (d) disposing said first and second members within said third member wherein said input ends of said first and second members are located within said input end of said third member and said output ends of said first and second members are located within said output end of said third member;
   (e) providing spacer means for reducing contact between said second member and said third member while providing structural support and an insulating space between said second and third members, and then,
   (f) bending said third member to cause said first and second fuel flows to be nonlinear.

2. A method in accordance with claim 1 which includes the step of disposing said first member within said second member.

3. A method in accordance with claim 1 which includes the step of helically disposing said second tube about said first tube.

* * * * *